US010803760B2

(12) United States Patent
Veronesi et al.

(10) Patent No.: US 10,803,760 B2
(45) Date of Patent: Oct. 13, 2020

(54) METHOD AND SYSTEM FOR RENDERING AND DISPLAYING A PERSPECTIVE VIEW OF AIRCRAFT TAXI OPERATION (71) Applicant: Rosemount Aerospace Inc., Burnsville, MN (US)

(72) Inventors: William A. Veronesi, Hartford, CT (US); David Ginsberg, Granby, CT (US); Julian C. Ryde, Alameda, CA (US); Joseph T. Pesik, Eagan, MN (US); Michael James Haukom, Farmington, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 253 days.

(21) Appl. No.: 15/783,919

(22) Filed: Oct. 13, 2017

(65) Prior Publication Data
US 2019/0114933 A1    Apr. 18, 2019

(51) Int. Cl.
G08G 5/06        (2006.01)
G08G 5/00        (2006.01)
(Continued)

(52) U.S. Cl.
CPC .......... *G08G 5/065* (2013.01); *B64D 45/00* (2013.01); *G08G 5/0013* (2013.01);
(Continued)

(58) Field of Classification Search
None
See application file for complete search history.

(56) References Cited

U.S. PATENT DOCUMENTS 6,405,975 B1   6/2002  Sankrithi et al.
6,571,166 B1   5/2003  Johnson et al.
(Continued)

FOREIGN PATENT DOCUMENTS

CA    2464791 A1    10/2004
CA    2737189 A1    10/2011
(Continued)

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.
(Continued)

*Primary Examiner* — Dale W Hilgendorf
*Assistant Examiner* — Alexander C. Bost
(74) *Attorney, Agent, or Firm* — Kinney & Lange, P.A.

(57) ABSTRACT

Apparatus and associated methods relate to rendering an image of objects in a region of an airport taxiway. The image is rendered from data provided by multiple sources. Three-dimensional models of static airport structures located within the region of an airport taxiway are provided. Rendered image data of the region of the airport taxiway if formed based on the retrieved three-dimensional models of the static airport structures. Data indicative of locations of dynamic objects within the region of the airport taxiway is also provided. Symbols identifying the dynamic objects within the region of the airport taxiway are mapped into the rendered image data at the locations indicated by the provided data. The rendered image data is sent to a display device configured to display the rendered image data.

19 Claims, 9 Drawing Sheets

(51) Int. Cl.
 *B64D 45/00* (2006.01)
 *G08G 5/04* (2006.01)
(52) U.S. Cl.
 CPC ......... *G08G 5/0021* (2013.01); *G08G 5/0086* (2013.01); *G08G 5/04* (2013.01)

(56) References Cited

U.S. PATENT DOCUMENTS

| | | | |
|---|---|---|---|
| 7,592,929 B2 | 9/2009 | Pepitone | |
| 7,804,981 B2 | 9/2010 | Viggiano et al. | |
| 7,974,773 B1 | 7/2011 | Krenz et al. | |
| 9,047,771 B1 | 6/2015 | Thoreen et al. | |
| 9,174,746 B1 | 11/2015 | Bell et al. | |
| 9,245,450 B1 | 1/2016 | Chiew et al. | |
| 9,401,094 B2 | 7/2016 | Cros et al. | |
| 9,783,320 B2* | 10/2017 | Barnes | B64D 47/08 |
| 10,043,405 B1* | 8/2018 | Chartier | G08G 5/045 |
| 2007/0067093 A1* | 3/2007 | Pepitone | G01C 23/005 |
| | | | 701/120 |
| 2007/0241936 A1 | 10/2007 | Arthur et al. | |
| 2010/0094487 A1 | 4/2010 | Brinkman | |
| 2012/0072105 A1 | 3/2012 | Feyereisen et al. | |
| 2014/0092206 A1 | 4/2014 | Boucourt et al. | |
| 2014/0278037 A1* | 9/2014 | Choksi | G08G 5/065 |
| | | | 701/120 |
| 2015/0084793 A1* | 3/2015 | Khatwa | B64D 45/00 |
| | | | 340/969 |
| 2015/0142214 A1 | 5/2015 | Cox et al. | |
| 2015/0154874 A1* | 6/2015 | Murthy | G08G 5/06 |
| | | | 701/120 |
| 2015/0193101 A1* | 7/2015 | Mannon | G01S 7/24 |
| | | | 715/771 |
| 2015/0194059 A1* | 7/2015 | Starr | G06F 3/0484 |
| | | | 701/3 |
| 2015/0194060 A1* | 7/2015 | Mannon | G08G 5/065 |
| | | | 701/301 |
| 2016/0063869 A1* | 3/2016 | Kathirvel | G08G 5/0043 |
| | | | 701/3 |
| 2016/0083111 A1 | 3/2016 | O'Dell et al. | |
| 2016/0093302 A1* | 3/2016 | Bilek | G10L 15/26 |
| | | | 704/235 |
| 2016/0133139 A1* | 5/2016 | Khatwa | B60Q 9/008 |
| | | | 701/301 |
| 2016/0171899 A1* | 6/2016 | Depare | G08G 5/065 |
| | | | 701/120 |
| 2016/0189551 A1* | 6/2016 | Pereira | G01C 21/00 |
| | | | 701/532 |
| 2016/0196754 A1 | 7/2016 | Surace | |
| 2017/0301250 A1 | 10/2017 | Ell et al. | |
| 2017/0334578 A1 | 11/2017 | Fleck et al. | |
| 2018/0233052 A1* | 8/2018 | Shamasundar | G08G 5/0021 |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 2892040 A1 | 7/2015 |
| EP | 3190579 A1 | 7/2017 |
| EP | 3431397 A1 | 1/2019 |
| JP | 2004145741 A | 5/2004 |
| WO | 2009010969 A2 | 1/2009 |

OTHER PUBLICATIONS

International Civil Aviation Organization, "Airport Markings: ICAO & U.S. Requirements", ICAO: Federal Aviation Administration, dated Jun. 2012, 19 pages.
U.S. Department of Transporation, "Advisory Circular", U.S. DOT: Federal Aviation Administration, dated Sep. 27, 2013, 144 pages.
Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.
Federal Aviation Administration, "A Quick Reference to Airfield Standards", FAA: Southern Region Airports Division, dated Jan. 2018, 69 pages.
Extended European Search Report dated Mar. 20, 2019, received for corresponding European Application No. 18198166.3.

* cited by examiner

METHOD AND SYSTEM FOR RENDERING AND DISPLAYING A PERSPECTIVE VIEW OF AIRCRAFT TAXI OPERATION

BACKGROUND

Each year, significant time and money are lost due to commercial aircraft accidents and incidents during ground operations, of which significant portions occur during taxiing maneuvers. Many aircraft have large wingspans, for example, which can make it difficult for a pilot to anticipate potential collisions with the wingtips. During ground operations, aircraft share the taxiways with other aircraft, fuel vehicles, baggage carrying trains, mobile stairways and many other objects. Aircraft often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. A method or system for rendering and displaying a perspective view of the aircraft and surrounding structures from a vantage point outside of aircraft would assist a pilot in avoiding objects external to the aircraft.

SUMMARY

Apparatus and associated methods relate to a method for displaying rendered image data of a region of an airport taxiway. A three-dimensional model of static airport structures located within a region of an airport taxiway is retrieved. Rendered image data of the region of the airport taxiway is formed based on the retrieved three-dimensional model of the static airport structures. Data indicative of locations of dynamic objects within the region of the airport taxiway is obtained. Symbols identifying the dynamic objects within the region of the airport taxiway at the locations indicated by the obtained data are mapped into the rendered image data. The rendered image data is sent to a display device configured to display the rendered image data Some embodiments relate to a system for displaying an image of static airport structures and dynamic objects within a region of an airport taxiway. The system includes one or more processors and one or more storage devices encoded with instructions. The instructions, when executed by the one or more processors, cause the system to retrieve a three-dimensional model of static airport structures located within a region of an airport taxiway. The instructions, when executed by the one or more processors, cause the system to form, based on the retrieved three-dimensional model of the static airport structures, rendered image data of the region of the airport taxiway. The instructions, when executed by the one or more processors, cause the system to obtain data indicative of locations of dynamic objects within the region of the airport taxiway. The instructions, when executed by the one or more processors, cause the system to map, into the rendered image data, symbols identifying the dynamic objects within the region of the airport taxiway at the locations indicated by the obtained data. The instructions, when executed by the one or more processors, also cause the system to send the rendered image data to a display device configured to display the rendered image data.

DETAILED DESCRIPTION

Apparatus and associated methods relate to rendering an image of objects in a region of an airport taxiway. The image is rendered from data provided by multiple sources. Three-dimensional models of static airport structures located within the region of an airport taxiway are provided. Rendered image data of the region of the airport taxiway is formed based on the retrieved three-dimensional models of the static airport structures. Data indicative of locations of dynamic objects within the region of the airport taxiway is also provided. Symbols identifying the dynamic objects within the region of the airport taxiway are mapped into the rendered image data at the locations indicated by the provided data. The rendered image data is sent to a display device configured to display the rendered image data.

Figure 1A:
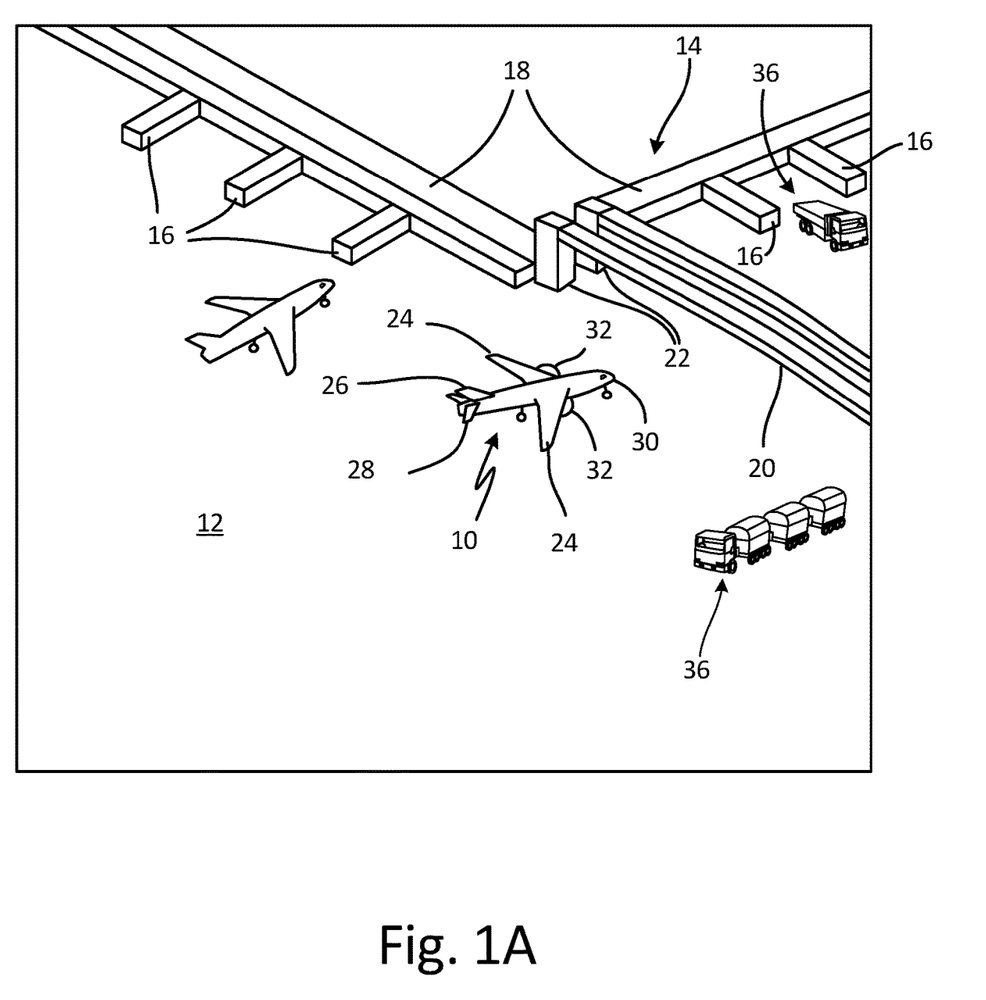
FIGS. 1A-1B are perspective and cockpit views, respectively, of objects in the surrounding environment of a taxiing aircraft.
Figure 1B:
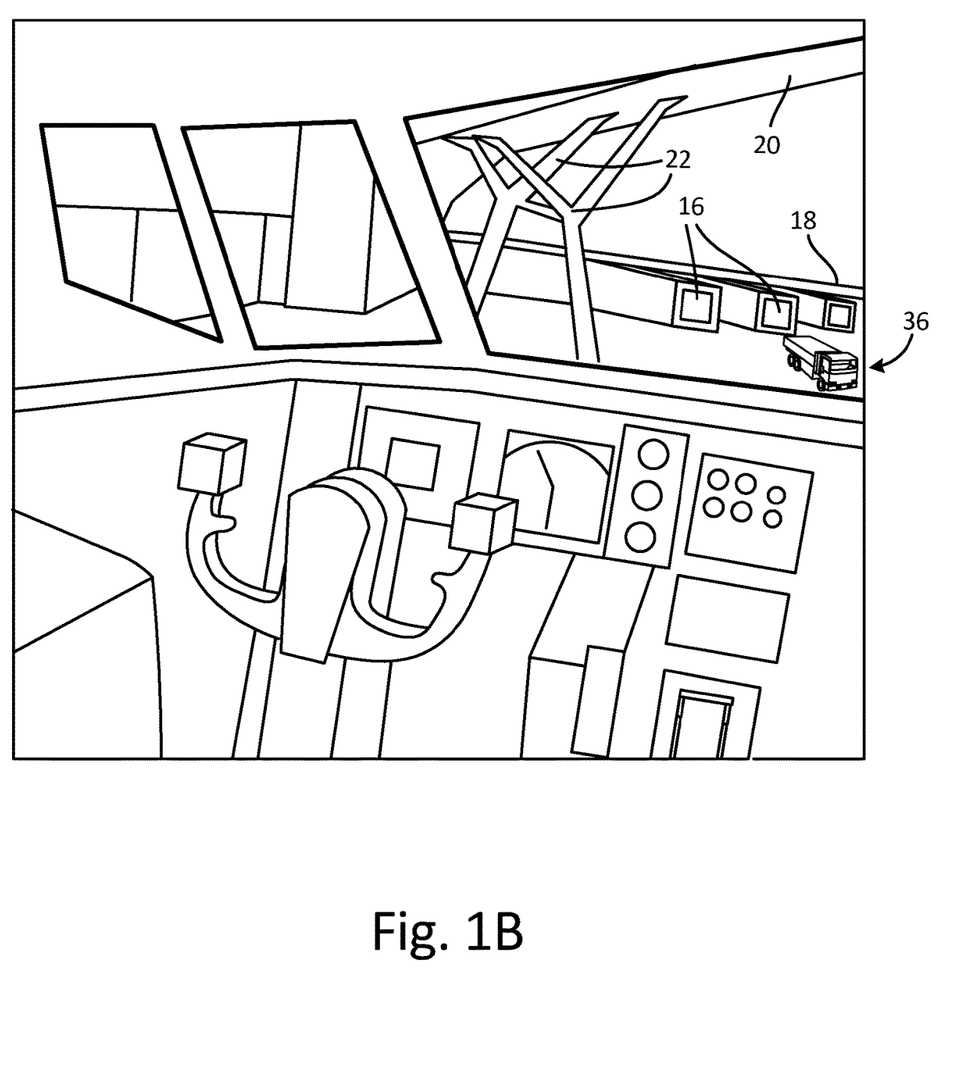

FIGS. 1A-1B are perspective and cockpit views, respectively, of objects in the surrounding environment of a taxiing aircraft. In FIG. 1A, taxiing aircraft 10 is navigating tarmac 12 of airport environment 14. Airport environment 14 includes various permanently fixed structures and mobile objects that potentially could impact or be impacted by taxiing aircraft 10. Fixed structures are static airport structures in that their locations are unchanging. These permanently fixed structures include, for example, gates 16, concourses 18, and bridge structure 20 supported by bridge piers 22. Also depicted in airport environment 14 are mobile vehicles 34 and 36 that do not have permanently fixed locations. Mobile vehicles are dynamic objects in that their locations can change over time.

Taxiing aircraft 10 has various extremity features that could potentially impact these fixed structures 16, 18, 20 and 22 and/or mobile vehicles 34 and 36 external to taxiing aircraft 10. Such extremity features include wingtips 24, vertical stabilizer 26, horizontal stabilizer 28, nose 30 and engine nacelles 32. These extremity features 24, 26, 28, 30 and 32 approximately define the spatial extent of taxiing aircraft 10. These extremity features 24, 26, 28, 30 and 32 can be at risk of collision with objects external to taxiing aircraft 10. To avoid such fixed structures 16, 18, 20 and 22 and dynamic objects 34 and 36, the pilot of taxiing aircraft 10 must be continually aware of the precise locations of these structures and objects, relative to taxiing aircraft 10.

In FIG. 1B, the fixed structures and dynamic objects that could potentially be impacted by taxiing aircraft 10, which are depicted in FIG. 1A, are shown from the viewpoint of a pilot seated in the cockpit of taxiing aircraft 10. The depicted view from the cockpit, as shown in FIG. 1B, is much more limited than the perspective view shown in FIG. 1A. Some of gates 16, concourses 18, and portions of bridge structure 20 supported by bridge piers 22 can be seen from the cockpit perspective, as can mobile vehicle 36. Other gates, concourses, portions of the bridge structure and mobile vehicles, such as mobile vehicle 34, cannot be seen from the cockpit perspective. Extremity features of taxiing aircraft 10, such as wingtips 24, vertical stabilizer 26, horizontal stabilizer 28, nose 30 and engine nacelles 32 (depicted in FIG. 1A) also are not visible from the cockpit perspective shown in FIG. 1B. Because extremity structures 24, 26, 28, 30 and 32 cannot be seen by the pilot, it can be difficult for a pilot to gauge whether such extremity structures 24, 26, 28, 30 and 32 are on a collision trajectory with one or more of the structures and objects external to taxiing aircraft 10.

Figure 2A:
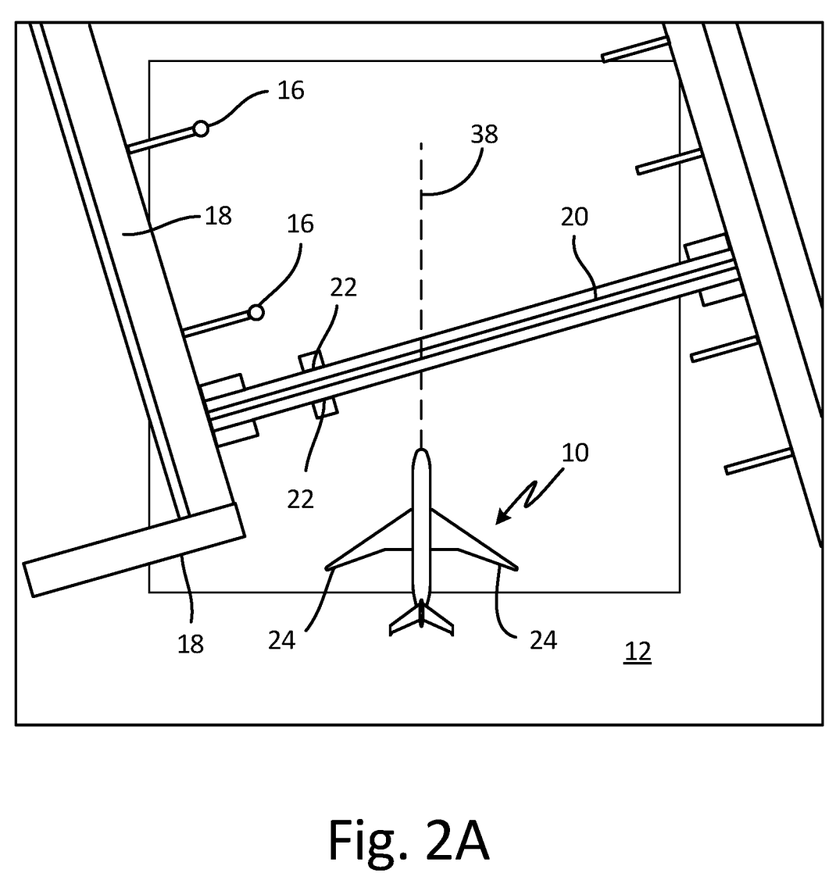
FIGS. 2A-2D are images rendered from a plan view perspective of the objects depicted in FIGS. 1A-1B in the surrounding environment of a taxiing aircraft.

FIGS. 2A-2D are images rendered from a plan view perspective of the objects depicted in FIGS. 1A-1B in the surrounding environment of a taxiing aircraft. FIG. 2A depicts an imaged rendered from the plan view perspective that includes taxiing aircraft 10 and fixed structures 12, 16, 18, 20 and 22. A system for rendering and displaying a perspective view of aircraft taxi operation has retrieved three-dimensional models of fixed structures 12, 16, 18, 20 and 22, and rendered them and taxiing aircraft 10 at locations corresponding to each. Taxiing aircraft 10 is rendered navigating tarmac 12 just before passing under bridge structure 20.

FIG. 2A shows static fixed airport objects 12, 16, 18, 20 and 22 located and oriented with respect to a location and orientation of taxiing aircraft 10. Such a rendered image, as depicted in FIG. 2A, can be displayed on a display device in the cockpit of taxiing aircraft 10, so that a pilot of taxiing aircraft 10 can visualize any hazards surrounding taxiing aircraft 10 from a different, and perhaps better, perspective than the view limited by the cockpit windows. Static airport objects displayed in FIG. 2A include tarmac 12, gates 16, concourse 18, bridge structure 20, and supporting bridge piers 22. Also displayed in the rendered image shown in FIG. 2A is a rendered version of taxiing aircraft 10. By combining static airport objects 12, 16, 18, 20 and 22 with rendered taxiing aircraft 10, distances between extremity features of taxiing aircraft 10, such as wingtips 24 of taxiing aircraft 10 and fixed objects 12, 16, 18, 20 and 22 can be visualized. Axis 38 of taxiing aircraft 10 is also depicted so as to communicate an orientation of taxiing aircraft 10 with respect to fixed airport objects 12, 16, 18, 20 and 22.

The system for rendering and displaying a perspective view of aircraft taxi operation can retrieve the three dimensional models of fixed objects, such as tarmac 12, gates 16, concourse 18, bridge structure 20, and supporting bridge piers 22, from a database. Then, such retrieved models can be rendered in various perspective manners. In some embodiments, the three dimensional models can be stored in a database at the location of airport environment 14 and transmitted to taxiing aircraft 10, for example. In other embodiments, the three dimensional models can be stored in a database in an electronic bay of the taxiing aircraft 10, for example. The system for rendering and displaying a perspective view of aircraft taxi operation can retrieve, from the database, a three-dimensional model of static airport structures located within a region of an airport taxiway. The system can then form rendered image data of the region of the airport taxiway, based on the retrieved three-dimensional model of the static airport structures. In some embodiments the three-dimensional models can be formed into rendered image data in any of various selectable perspectives, such as the plan-view perspective shown in FIG. 2A. The retrieved three-dimensional models of static airport structures can be rendered from other perspective views, such as a perspective view from a vertical stabilizer position, or from a wingtip position, for example.

Figure 2B:
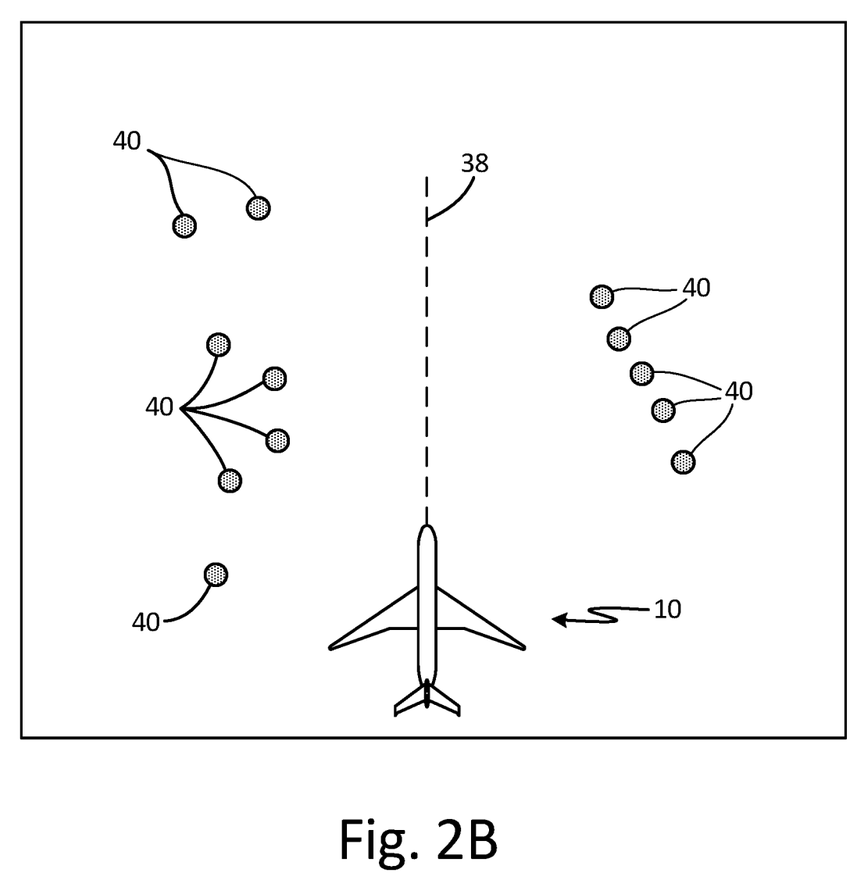

FIG. 2B shows symbols indicative of objects detected by an object detection system mounted to taxiing aircraft 10. An object detection system can be mounted on taxiing aircraft 10, can detect objects external to taxiing aircraft 10, and can calculate location and range of such external objects with respect to taxiing aircraft 10. Various object detection systems have various capabilities. For example, some object detection systems determine a range to an object using triangulation of spatially-patterned light projected upon and reflected from the object, as disclosed by Ell et al. in U.S. patent application Ser. No. 15/385,224, filed Dec. 20, 2016, titled "A Method and System for Aircraft Taxi Strike Alerting," the entire disclosure of which is hereby incorporated by reference.

In some embodiments, the object detection system can generate a three-dimensional model of the detected objects. In some embodiments, the object detection system can generate data indicative of locations in three-dimensional space of detected portions of objects, such as, for example, the location of the nearest features and/or corner features of the objects to taxiing aircraft 10. Such data and/or models can be used to render symbols and/or image data of the detected objects. Then, a system for rendering and displaying a perspective view of aircraft taxi operation can form, based on the generated three-dimensional model of the detected objects, rendered image data of the detected objects, for example. In some embodiments, the system for rendering and displaying a perspective view of aircraft taxi operation can form image symbols indicative of the locations of features of the detected objects that are nearest to taxiing aircraft 10.

In the FIG. 2B depiction, such locations of the nearest features of the detected objects are indicated by image symbols 40. Each of image symbols 40 depicts a nearest feature and/or a corner feature of the detected objects in the perspective selected, which in this depiction is the plan view perspective. In FIG. 2B an object detection system mounted to taxiing aircraft 10 has detected a number of objects external to taxiing aircraft 10. The object detection system has generated data indicative of the three-dimensional location, relative to taxiing aircraft 10, of each of the detected objects. The system for rendering and displaying a perspective view of aircraft taxi operation then forms, based on the generated data indicative of the three-dimensional locations, rendered image symbols 40 indicative of such three-dimensional locations, for example.

Figure 2C:
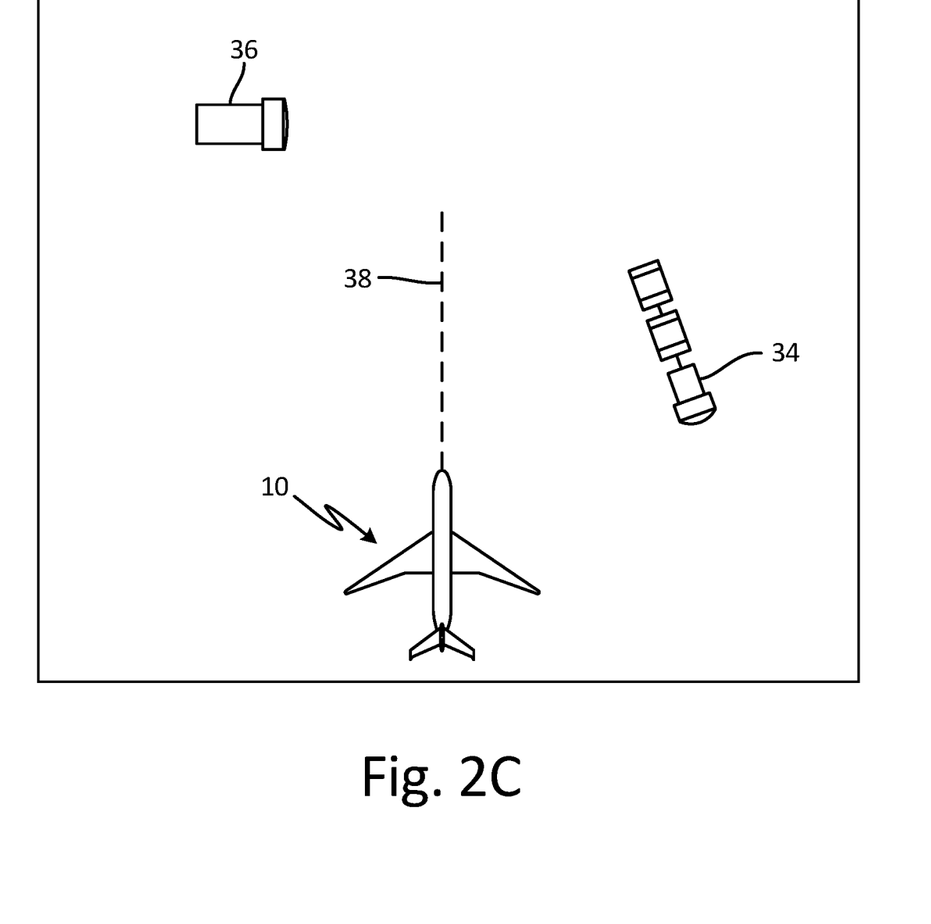

FIG. 2C shows symbols indicative of objects reported to taxiing aircraft 10 by an Automatic Dependent Surveillance Broadcast (ADS-B) system. ADS-B data from ADS-B equipped objects external to the taxiing aircraft is transmitted to taxiing aircraft 10 by ADS-B equipped objects external to taxiing aircraft 10. The ADS-B data is indicative of locations of ADS-B equipped objects, such as ADS-B equipped mobile vehicles, for example. The ADS-B data can also be indicative of the type of object that is ADS-B equipped and/or an orientation and/or speed of the ADS-B equipped object. Three-dimensional models of the ADS-B equipped objects can be used for image rendering of the ADS-B equipped objects reported to taxiing aircraft 10. The system for rendering and displaying a perspective view of aircraft taxi operation can then form, based on the reported location and orientation, rendered images of the ADS-B equipped objects. FIG. 2C shows such rendered images of ADS-B equipped mobile vehicles 34 and 36.

Figure 2D:
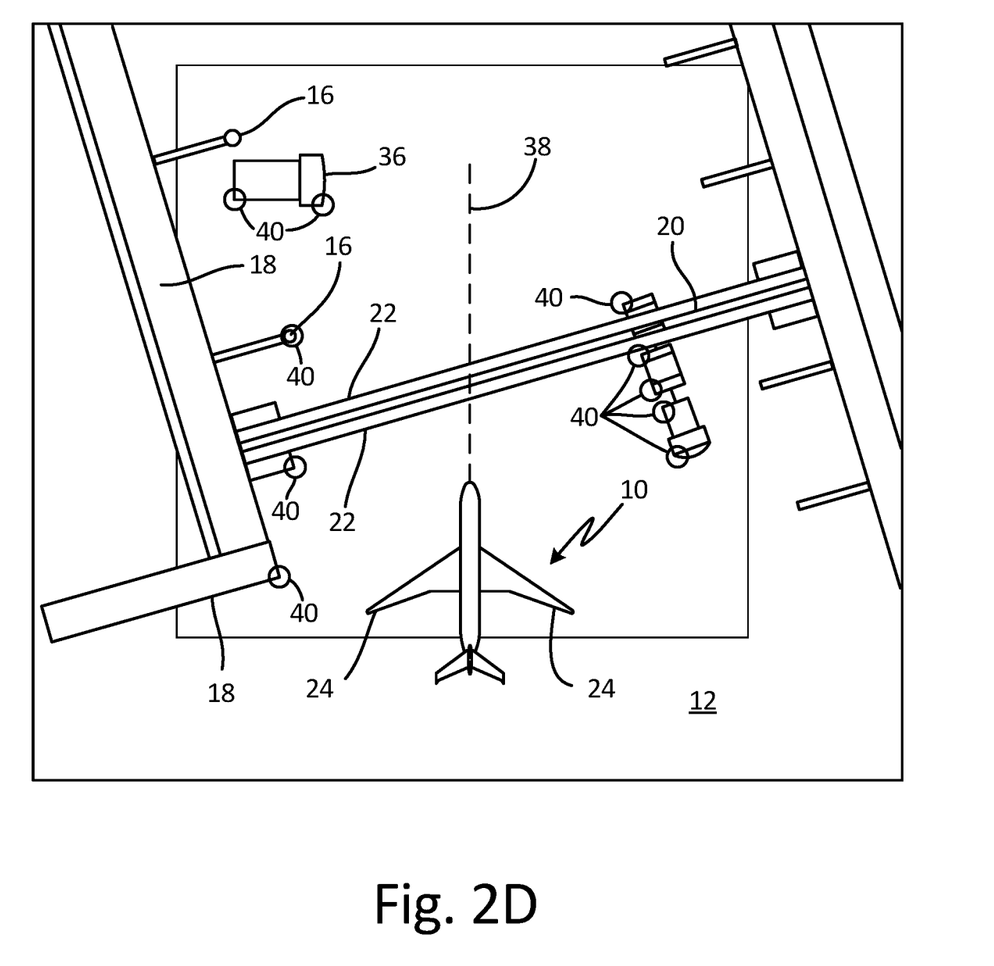

FIG. 2D shows a rendered image of the airport environment external to taxiing aircraft 10 that includes static airport structures 12, 16, 18, 20 and 22, symbols 40 indicative of objects detected by an object detection system, and objects 34 and 36 reported to taxiing aircraft 10 by an ADS-B system. The system for rendering and displaying a perspective view of aircraft taxi operation can retrieve three-dimensional models of static airport structures 12, 16, 18, 20 and 22 located within a region of an airport taxiway from a database. Rendered image data of the region of the airport taxiway is formed, based on the retrieved three-dimensional models of static airport structures 12, 16, 18, 20 and 22.

Data indicative of locations of dynamic objects within the region of the airport taxiway is obtained by one or more methods. In the depicted embodiment, data is retrieved from an object detection system mounted to taxiing aircraft 10. Circular symbols 40 indicating the nearest locations of these detected objects are mapped into the rendered image data. In the depicted embodiment, data is also collected from ADS-B equipped dynamic objects 34 and 36. The ADS-B data can be indicative of locations of the ADS-B equipped dynamic objects 34 and 36. Three-dimensional models corresponding to the reported ADS-B equipped dynamic objects 34 and 36 can then be retrieved. In this way, these ADS-B equipped objects 34 and 36 can be mapped into the rendered image data.

In some embodiments, gates 16 can be moveable, and could be equipped as ADS-B dynamic objects, or could otherwise transmit location and orientation information to taxiing aircraft 10. Such ADS-B equipped gates can also report their positions and/or configurations to taxiing aircraft 10. After all the dynamic objects have been mapped into the rendered image data, the rendered image data can be sent to a display device configured to display the rendered image data. Such a display device can be located in a cockpit so that a pilot of taxiing aircraft 10 can view the rendered image data. In some embodiments, a system for rendering and displaying a perspective view of aircraft taxi operation can be used by aircraft ground traffic controllers. In such an embodiment, the display device can be located in an aircraft control tower so that the aircraft ground traffic controllers can view the rendered image data.

Figure 3:
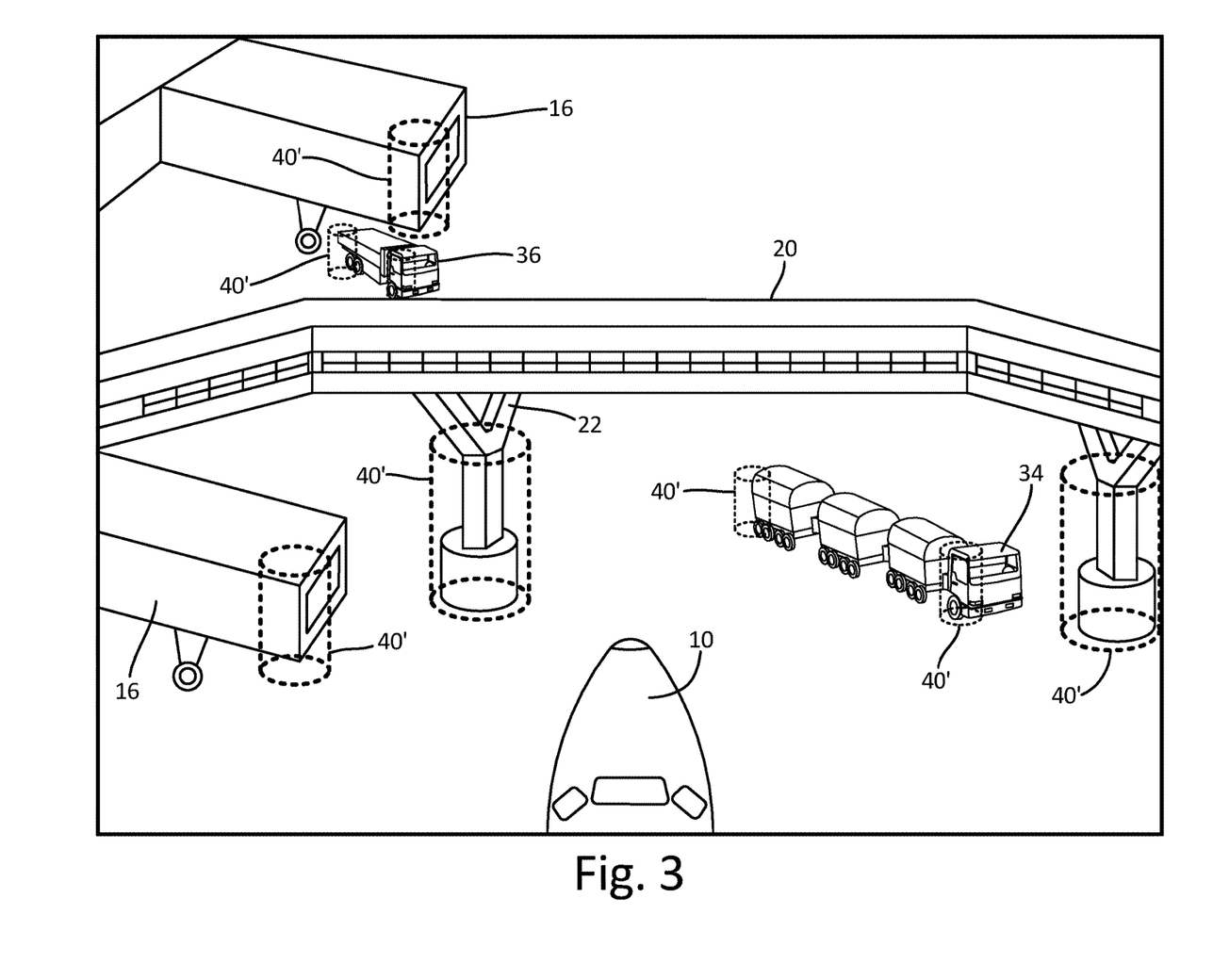
FIG. 3 is an image of the structures and objects depicted in FIGS. 1A-1B in the surrounding environment of taxiing aircraft 10 rendered from a perspective view.

FIG. 3 is an image of the structures and objects depicted in FIGS. 1A-1B in the surrounding environment of taxiing aircraft 10 rendered from a perspective view. In FIG. 3, the fixed structures and dynamic objects shown in FIG. 2D are rendered again, but from a perspective above and behind the cockpit of taxiing aircraft 10. FIG. 3 depicts a nose of taxiing aircraft 10 as taxiing aircraft 10 approaches passing beneath bridge structure 20. Other static aircraft structures are also rendered, such as bridge piers 22 and gates 16. Dynamic objects external to the aircraft, such as ADS-B equipped mobile vehicles 34 and 36, are also rendered in FIG. 3. Taxiing aircraft 10 is equipped with an object detection system. Cylindrical symbols 40' indicate locations of nearest features of objects detected by the object detection system. Cylindrical symbols 40' are the perspective equivalent symbols to circular symbols 40 depicted in the plan views shown in FIGS. 2B and 2D. In some embodiments, the ability to render the airport environment from different vantage points can advantageously provide pilots and/or ground traffic controllers with the ability to render imagery from a vantage point that assists such personnel in their duties.

Figure 4:
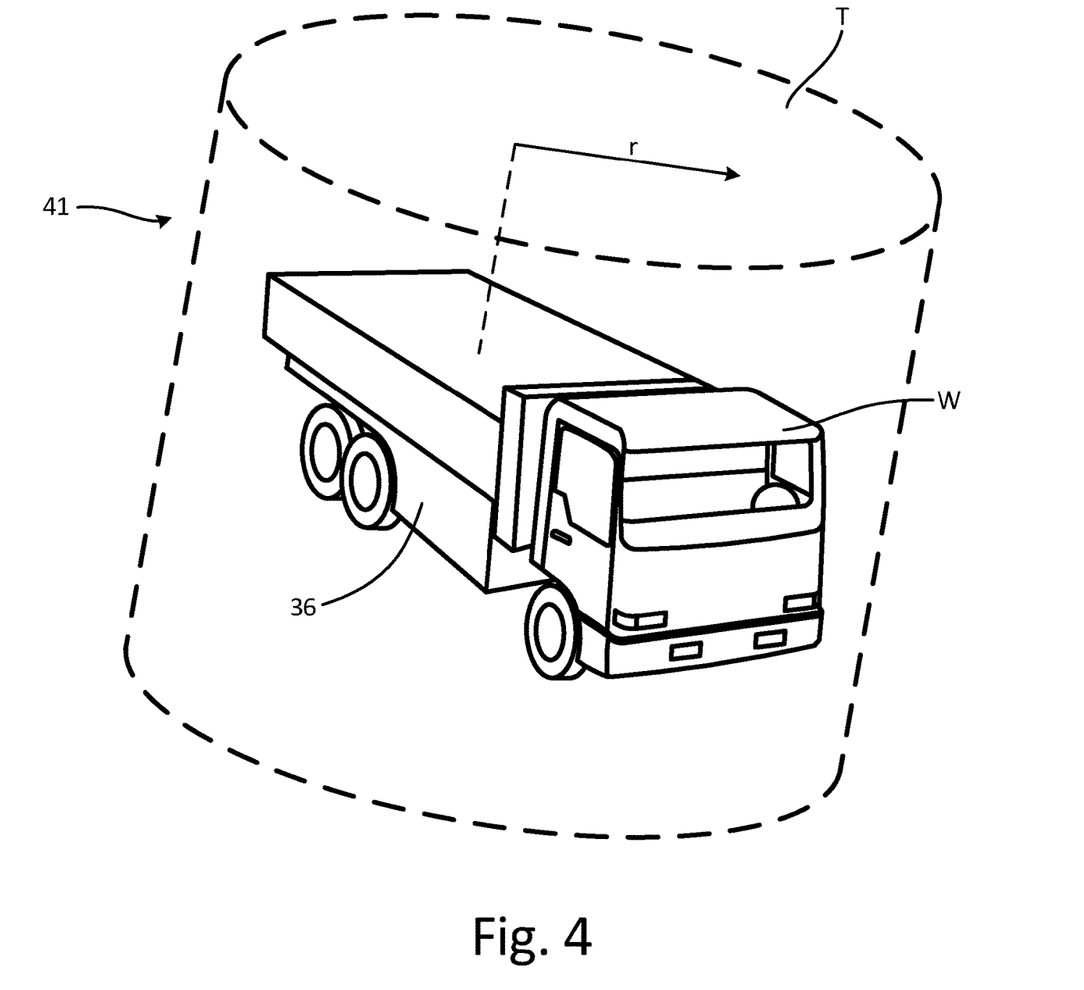
FIG. 4 is a ground vehicle shown with a surrounding hazard zone.

In FIG. 4, ADS-B reporting mobile vehicle 36 is shown surrounded by hazard zone 41. In some embodiments, ADS-B reporting vehicle 36 might not report an orientation of such vehicle. In such circumstances, taxiing aircraft 10 (depicted in FIGS. 1A-3) can attempt to ascertain the orientation of ADS-B reporting vehicle 36 so as to be able to render ADS-B reporting vehicle faithfully. In other circumstances, taxiing aircraft 10 can simply render ADS-B reporting vehicle in a standard orientation. In either circumstance, the system for rendering and displaying a perspective view of aircraft taxi operation can show a hazard zone 41 that surrounds ADS-B reporting vehicle 36. Hazard zone 41, for example, can be indicative of a periphery representing a maximum extent of ADS-B reporting vehicle 36. Hazard zone 41, might, for example, be cylindrical as shown in FIG. 4. The top surface T of cylindrical hazard zone 41 can be indicative of a maximum height of ADS-B reporting vehicle 36. And radius r of cylindrical hazard zone 41 can be indicative of a maximum lateral extent of ADS-B reporting vehicle 36 from the location reported. Cylindrical walls W can be indicative of this maximum lateral extent of ADS-B reporting vehicle 36.

Figure 5:
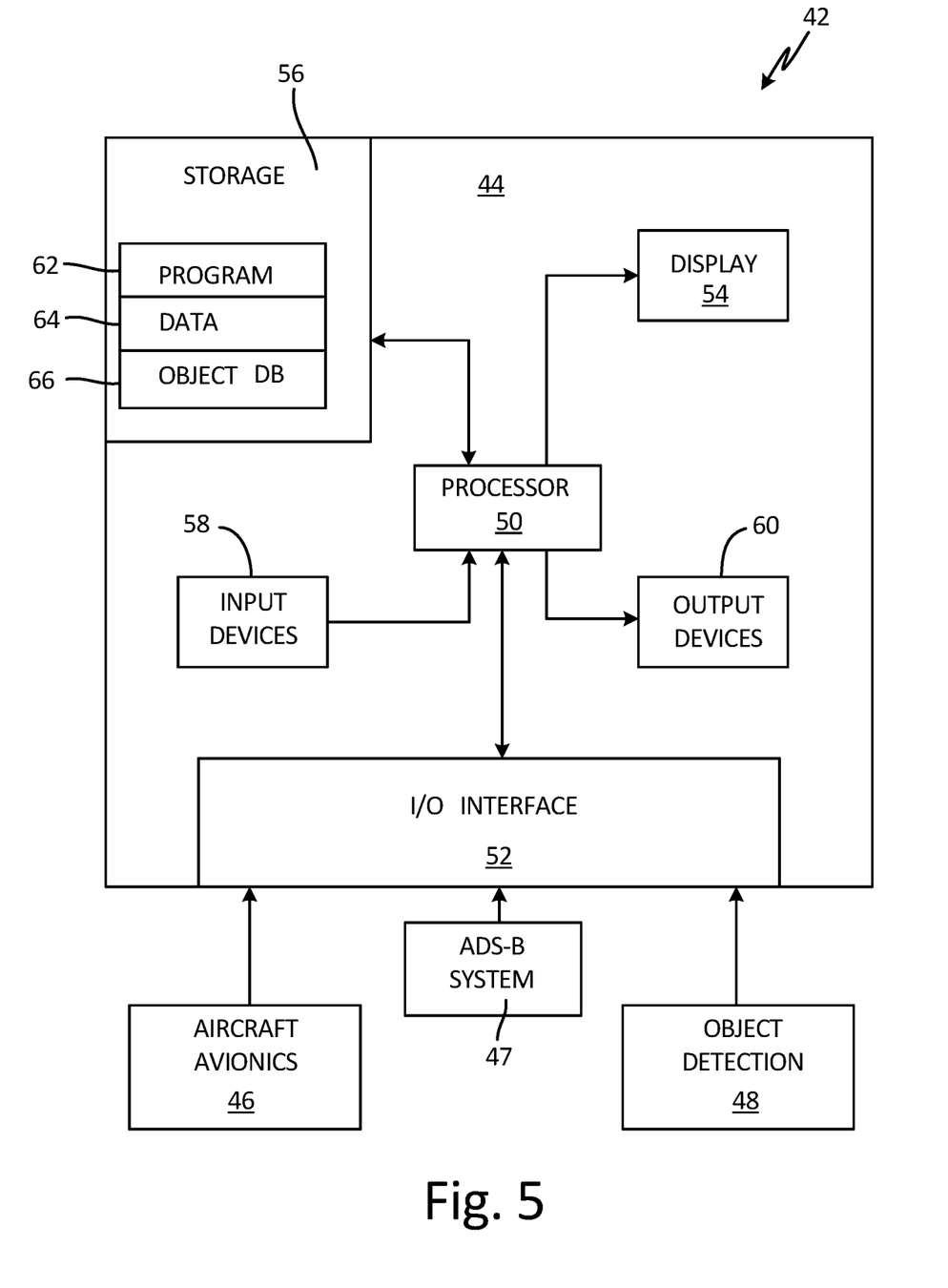
FIG. 5 is block diagram of an embodiment of a system for rendering and displaying a perspective view of aircraft taxi operation.

FIG. 5 is block diagram of an embodiment of a system 42 for rendering and displaying a perspective view of aircraft taxi operation. In FIG. 5, the system 42 for rendering and displaying a perspective view of aircraft taxi operation includes image data rendering system 44, aircraft avionics 46, ADS-B interface system 47, and object detection system 48. Image data rendering system 44 includes processor(s) 50, input/output interface 52, display device 54, storage device(s) 56, user input devices 58, and user output devices 60. Storage device(s) 56 has various storage or memory locations. Storage device(s) 56 includes program memory 62, data memory 64, and fixed-object database 66. In some embodiments, the object database can include dynamic objects.

Image data rendering system 44 is in communication with aircraft avionics 46, ADS-B interface system 47, and object detection system 48 via input/output interface 52. Aircraft avionics 46 can provide image data rendering system 44 with metrics indicative of a taxiing aircrafts location, orientation, speed, etc. ADS-B interface system 47 can transmit and/or receive ADS-B data to and/or from ADS-B equipped objects. Object detection system 48 can provide image data rendering system 44 with range, location, orientation and/or velocity data for objects external to the taxiing aircraft. Object detection system 48 can provide, for example, such data for dynamic objects such as other aircraft, aircraft towing vehicles, baggage carts, fuel vehicles, etc.

As illustrated in FIG. 5, image data rendering system 44 includes processor(s) 50, input/output interface 52, display device 54, storage device(s) 56, user input devices 58, and user output devices 60. However, in certain examples, image data rendering system 44 can include more or fewer components. For instance, in examples where image data rendering system 44 is an avionics unit, image data rendering system 44 may not include user input devices 58 and/or user output devices 60. In some examples, such as where image data rendering system 44 is a mobile or portable device such as a laptop computer, image data rendering system 44 may include additional components such as a battery that provides power to components of image data rendering system 44 during operation.

Processor(s) 50, in one example, is configured to implement functionality and/or process instructions for execution within image data rendering system 44. For instance, processor(s) 50 can be capable of processing instructions stored in storage device(s) 56. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuitry.

Input/output interface 52, in some examples, includes a communications module. Input/output interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Display device 54 can be used to communicate information between image data rendering system 44 and a pilot of the taxiing aircraft. In some embodiments display device 54 can include a visual display and/or an audible system. The audible system can include a horn and or a speaker. The visual display can use any of CRT, LCD, Plasma, and/or OLED technologies, for example, including an Electronic Flight Bag (EFB) or Primary Flight Display (PFD).

Storage device(s) 56 can be configured to store information within image data rendering system 44 during operation. Storage device(s) 56, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 56 is a temporary memory, meaning that a primary purpose of storage device(s) 56 is not long-term storage. Storage device(s) 56, in some examples, is described as volatile memory, meaning that storage device(s) 56 do not maintain stored contents when power to image data rendering system 44 is turned off. Examples of volatile memories can include random access memories (RAM), dynamic random access memories (DRAM), static random access memories (SRAM), and other forms of volatile memories. In some examples, storage device(s) 56 is used to store program instructions for execution by processor(s) 50. Storage device(s) 56, in one example, is used by software or applications running on image data rendering system 44 (e.g., a software program implementing long-range cloud conditions detection) to temporarily store information during program execution.

Storage device(s) 56, in some examples, also include one or more computer-readable storage media. Storage device(s) 56 can be configured to store larger amounts of information than volatile memory. Storage device(s) 56 can further be configured for long-term storage of information. In some examples, storage device(s) 56 include non-volatile storage elements. Examples of such non-volatile storage elements can include magnetic hard discs, optical discs, flash memories, or forms of electrically programmable memories (EPROM) or electrically erasable and programmable (EEPROM) memories.

User input devices 58, in some examples, are configured to receive input from a user. Examples of user input devices 58 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 60 can be configured to provide output to a user. Examples of user output devices 60 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

In some embodiments, user output devices 60 can include a sound system, such as, for example, a speaker. In such embodiments, audible warnings and/or directions can be provided to a pilot. For example, in response to detecting objects in the path of the taxiing aircraft, commands and/or warnings such as "stop," "turn right," "turn left," and/or "slow" can be audibly provided to the pilot.

In some embodiments, a destination location of taxiing aircraft 10 can be entered and/or retrieved. A safe route through from a current location to a destination location can be charted. A safe route avoids all fixed airport structures and dynamic objects in airport environment 14.

In some embodiments, the current location of taxiing aircraft 10 is obtained from a Global Positioning System (GPS) mounted to taxiing aircraft 10. In some embodiments a central database can be maintained, for example, at an airport. Aircraft equipped with systems for detecting objects external to the aircraft can contribute location information of the detected objects to the central database. In some embodiments, both location and projected path of dynamic objects can be estimated. In some embodiments, output signals can be generated in response to potential collisions. Such signals can be used to automatically perform various aircraft operations, such as, for example, actuating braking, and/or steering functions. In some embodiments, the rendered image data can be stored so as to be able to be replayed at a later time. Replay of stored rendered image data can be used, for example, for training purposes and or reenactment of incidents to help determine the root causes of such incidents. In some embodiments, the rendered image data can be shared with other vehicles, and or objects in the region of the taxiing aircraft. For example, in some embodiments, the rendered image data can be shared with both a taxiing aircraft and with a ground tug vehicle performing a pushback and/or a towing operation on such taxiing aircraft.

Discussion of Possible Embodiments

The following are non-exclusive descriptions of possible embodiments of the present invention.

Apparatus and associated methods relate to a system for displaying an image of static airport structures and dynamic objects within a region of an airport taxiway. The system includes one or more processors and one or more storage devices. The one or more storage devices are encoded with instructions that, when executed by the one or more processors, cause the system to retrieve a three-dimensional model of static airport structure(s) located within a region of an airport taxiway. The one or more storage devices are further encoded with instructions that, when executed by the one or more processors, cause the system to form, based on the retrieved three-dimensional model of the static airport structure(s), rendered image data of the region of the airport taxiway. The one or more storage devices are further encoded with instructions that, when executed by the one or more processors, cause the system to obtain data indicative of locations of dynamic object(s) within the region of the airport taxiway. The one or more storage devices are further encoded with instructions that, when executed by the one or more processors, cause the system to map, into the rendered image data, symbol(s) identifying the dynamic object(s) within the region of the airport taxiway at the location(s) indicated by the obtained data. The one or more storage devices are further encoded with instructions that, when executed by the one or more processors, cause the system to send the rendered image data to a display device configured to display the rendered image data.

The system of the preceding paragraph can optionally include, additionally and/or alternatively, any one or more of the following features, configurations and/or additional components:

A further embodiment of the foregoing system can further include a Global Positioning System (GPS) mounted to the taxiing aircraft. The one or more storage devices can be further encoded with instructions that, when executed by the one or more processors, cause the system to collect, from the GPS, data indicative of a location and orientation of the taxiing aircraft. The one or more storage devices can be further encoded with instructions that, when executed by the one or more processors, cause the system to map into the image data a symbol of the taxiing aircraft at the location and orientation indicated by the collected data indicative of the location and orientation of the taxiing aircraft.

A further embodiment of any of the foregoing systems, wherein the one or more storage devices are further encoded with instructions that, when executed by the one or more processors, cause the system to identify the dynamic object(s) obtained within the region of the airport taxiway indicated by the obtained data. The one or more storage devices can be further encoded with instructions that, when executed by the one or more processors, cause the system to retrieve a three-dimensional model(s) corresponding to the identified dynamic object(s). The symbols identifying the dynamic object(s) can be based on the retrieved three-dimensional model(s).

A further embodiment of any of the foregoing systems, wherein the one or more storage devices are further encoded with instructions that, when executed by the one or more processors, cause the system to determine an orientation of each of the dynamic object(s) within the region of the airport taxiway indicated by the obtained data. The symbol(s) identifying the dynamic object(s) can be indicative of the corresponding determined orientations of the dynamic object(s).

A further embodiment of any of the foregoing systems, wherein the one or more storage devices are further encoded with instructions that, when executed by the one or more processors, cause the system to determine a hazard zone containing each of the dynamic object(s) obtained within the region of the airport taxiway. The symbol(s) identifying the dynamic object(s) can be indicative of the corresponding determined hazard zone containing the corresponding dynamic object.

Some embodiments relate to a method for displaying rendered image data of a region of an airport taxiway. The method includes retrieving three-dimensional model(s) of static airport structure(s) located within a region of an airport taxiway. The method includes forming, based on the retrieved three-dimensional model(s) of the static airport structure(s), rendered image data of the region of the airport taxiway. The method includes obtaining data indicative of location(s) of dynamic object(s) within the region of the airport taxiway. The method includes mapping, into the rendered image data, symbol(s) identifying the dynamic object(s) within the region of the airport taxiway at the locations indicated by the obtained data. The method also includes sending the rendered image data to a display device configured to display the rendered image data.

The method of the preceding paragraph can optionally include, additionally and/or alternatively, any one or more of the following features, configurations and/or additional components:

A further embodiment of the foregoing method, wherein obtaining data indicative of location(s) of dynamic object(s) can include retrieving data from an object detection system mounted to a taxiing aircraft.

A further embodiment of any of the foregoing methods, wherein obtaining data indicative of location(s) of dynamic object(s) can include collecting Automatic Dependent Surveillance Broadcast (ADS-B) data from ADS-B equipped dynamic object(s), the ADS-B data being indicative of locations of the ADS-B equipped dynamic object(s).

A further embodiment of any of the foregoing methods can further include identifying the dynamic object(s) within the region of the airport taxiway indicated by the obtained data. Any of the foregoing methods can further include retrieving three-dimensional model(s) corresponding to the identified dynamic object(s). The symbol(s) identifying the dynamic object(s) can be based on the retrieved three-dimensional model(s).

A further embodiment of any of the foregoing methods can further include determining a hazard zone containing each of the dynamic object(s) within the region of the airport taxiway indicated by the obtained data. The symbol(s) identifying the dynamic object(s) can be indicative of the corresponding determined hazard zone containing the corresponding dynamic object.

A further embodiment of any of the foregoing methods can further include determining a hazard zone containing each of the dynamic object(s) within the region of the airport taxiway indicated by the obtained data. The symbol(s) identifying the dynamic object(s) can be indicative of the corresponding determined hazard zone containing the corresponding dynamic object.

A further embodiment of any of the foregoing methods, wherein the rendered image data can be rendered from a selectable perspective view.

A further embodiment of any of the foregoing methods, wherein the perspective view can be selected as a plan view perspective of the region of the airport taxiway and/or a perspective view of a pilot.

A further embodiment of any of the foregoing methods, wherein the region of the airport taxiway can include locations within a predetermined distance of a taxiing aircraft.

A further embodiment of any of the foregoing methods can further include receiving data indicative of a velocity and/or steering orientation of the taxiing aircraft.

A further embodiment of any of the foregoing methods can further include calculating, based at least in part on the received data indicative of the velocity and/or steering orientation of the taxiing aircraft, a trajectory of the taxiing aircraft within the region of the airport taxiway. Any of the foregoing methods can further include mapping into the rendered image data a symbol indicative of the calculated trajectory of the taxiing aircraft A further embodiment of any of the foregoing methods can further include determining if the location(s) of the dynamic object(s) and/or static airport structure(s) within the region of the airport taxiway are within the calculated trajectory of the taxiing aircraft.

A further embodiment of any of the foregoing methods can further include maintaining a master model of the airport taxiway.

A further embodiment of any of the foregoing methods can further include sharing data sets between the taxiing aircraft and the master model.

A further embodiment of any of the foregoing methods can further include retrieving a destination location for the taxiing aircraft. Any of the foregoing methods can further include calculating a route from a current location of the taxiing aircraft to the received destination location of the taxiing aircraft, the calculated route avoiding collision with the dynamic object(s) and/or static airport structure(s) external to the taxiing aircraft. Any of the foregoing methods can further include mapping into the rendered image data at least a portion of the calculated route While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for displaying a rendered perspective view of a region of an airport taxiway, the method comprising:
retrieving three-dimensional model(s) of static airport structure(s) located within a region of an airport taxiway within a predetermined distance of a taxiing aircraft;
forming, based on the retrieved three-dimensional model(s) of the static airport structure(s), a rendered perspective view of the region of the airport taxiway within a predetermined distance of the taxiing aircraft, wherein the perspective view depicts three-dimensionality image data of the region from a specific position in three-dimensional space;
obtaining data indicative of location(s) of the nearest features of dynamic object(s) within the region of the airport taxiway, the nearest features being the features of the dynamic object(s) nearest to the taxiing aircraft;
mapping, into the rendered perspective view, symbol(s) identifying the nearest features of the dynamic object(s) within the region of the airport taxiway at the location(s) indicated by the obtained data; and
sending the rendered perspective view to a display device configured to display the rendered perspective view.

2. The method of claim 1, wherein obtaining data indicative of location(s) of the nearest features of the dynamic object(s) includes:
retrieving data from an object detection system mounted to the taxiing aircraft.

3. The method of claim 1, wherein obtaining data indicative of location(s) of the nearest features of dynamic object(s) includes:
collecting Automatic Dependent Surveillance Broadcast (ADS-B) data from ADS-B equipped dynamic object(s), the ADS-B data being indicative of locations of the ADS-B equipped dynamic object(s).

4. The method of claim 1, further comprising:
identifying the dynamic object(s) within the region of the airport taxiway within a predetermined distance of the taxiing aircraft indicated by the obtained data; and
retrieving three-dimensional model(s) corresponding to the identified dynamic object(s),
wherein the symbol(s) identifying the dynamic object(s) are based on the retrieved three-dimensional model(s).

5. The method of claim 1, further comprising:
determining an orientation of each of the dynamic object(s) within the region of the airport taxiway indicated by the obtained data,
wherein the symbols identifying the dynamic object(s) are indicative of the corresponding determined orientations of the dynamic object(s).

6. The method of claim 1, further comprising:
determining a hazard zone containing each of the dynamic object(s) within the region of the airport taxiway within a predetermined distance of the taxiing aircraft indicated by the obtained data,
wherein the symbol(s) identifying the dynamic object(s) are indicative of the corresponding determined hazard zone containing the corresponding dynamic object.

7. The method of claim 1, wherein the rendered perspective view is rendered from a selectable perspective view.

8. The method of claim 7, wherein the perspective view can be selected as a plan view perspective of the region of the airport taxiway within a predetermined distance of the taxiing aircraft and/or a perspective view of a pilot.

9. The method of claim 1, further comprising:
receiving data indicative of a velocity and/or steering orientation of the taxiing aircraft.

10. The method of claim 9, further comprising:
calculating, based at least in part on the received data indicative of the velocity and/or steering orientation of the taxiing aircraft, a trajectory of the taxiing aircraft within the region of the airport taxiway; and mapping into the rendered perspective view a symbol indicative of the calculated trajectory of the taxiing aircraft.

11. The method of claim 10, further comprising:
determining if the location(s) of the dynamic object(s) and/or static airport structure(s) within the region of the airport taxiway are within the calculated trajectory of the taxiing aircraft.

12. The method of claim 1, further comprising:
maintaining a central database of the airport taxiway.

13. The method of claim 12, further comprising:
sharing data sets between the taxiing aircraft and the central database.

14. The method of claim 1, further comprising:
retrieving a destination location for the taxiing aircraft;
calculating a route from a current location of the taxiing aircraft to the retrieved destination location of the taxiing aircraft, the calculated route avoiding collision with the dynamic object(s) and/or static airport structure(s) external to the taxiing aircraft; and
mapping into the rendered perspective view at least a portion of the calculated route.

15. A system for displaying a perspective view of a region of an airport taxiway, the system comprising:
one or more processors; and
one or more storage devices encoded with instructions that, when executed by the one or more processors, cause the system to:
retrieve a three-dimensional model of static airport structure(s) located within a region of an airport taxiway;
form, based on the retrieved three-dimensional model of the static airport structure(s), rendered perspective view of the region of the airport taxiway, wherein the perspective view depicts three-dimensionality image data of the region from a specific position in three-dimensional space;
obtain data indicative of locations of the nearest features of dynamic object(s) within the region of the airport taxiway, the nearest features being the features of the dynamic object(s) nearest to the taxiing aircraft;
map, into the rendered perspective view, symbol(s) identifying the nearest features of dynamic object(s) within the region of the airport taxiway at the location(s) indicated by the obtained data; and
send the rendered perspective view to a display device configured to display the rendered perspective view.

16. The system of claim 15, further comprising:
a Global Positioning System (GPS) mounted to a taxiing aircraft,
wherein the one or more storage devices are further encoded with instructions that, when executed by the one or more processors, cause the system to:
collect, from the GPS, data indicative of a location and orientation of the taxiing aircraft; and
map into the perspective view a symbol of the taxiing aircraft at the location and orientation indicated by the collected data indicative of the location and orientation of the taxiing aircraft.

17. The system of claim 15, wherein the one or more storage devices are further encoded with instructions that, when executed by the one or more processors, cause the system to:
identify the dynamic object(s) obtained within the region of the airport taxiway indicated by the obtained data; and
retrieve a three-dimensional model(s) corresponding to the identified dynamic object(s),
wherein the symbols identifying the dynamic object(s) are based on the retrieved three-dimensional model(s).

18. The system of claim 15, wherein the one or more storage devices are further encoded with instructions that, when executed by the one or more processors, cause the system to:
determine an orientation of each of the dynamic object(s) within the region of the airport taxiway indicated by the obtained data,
wherein the symbol(s) identifying the dynamic object(s) are indicative of the corresponding determined orientations of the dynamic object(s).

19. The system of claim 15, wherein the one or more storage devices are further encoded with instructions that, when executed by the one or more processors, cause the system to:
determine a hazard zone containing each of the dynamic object(s) obtained within the region of the airport taxiway,
wherein the symbol(s) identifying the dynamic object(s) are indicative of the corresponding determined hazard zone containing the corresponding dynamic object.

* * * * *